Oct. 24, 1961 A. HEMMENDINGER ET AL 3,005,950
PRECISION INTEGRATOR FOR MINUTE ELECTRIC CURRENTS
Filed Feb. 7, 1958 2 Sheets-Sheet 1

INVENTORS.
Richard J. Helmer
Arthur Hemmendinger
BY
Roland A. Anderson
Attorney

PRECISION INTEGRATOR FOR MINUTE ELECTRIC CURRENTS

Filed Feb. 7, 1958 2 Sheets-Sheet 2

INVENTORS
Richard J. Helmer
Arthur Hemmendinger
BY
Roland A. Anderson
Attorney

United States Patent Office 3,005,950

Patented Oct. 24, 1961

1

3,005,950

PRECISION INTEGRATOR FOR MINUTE ELECTRIC CURRENTS

Arthur Hemmendinger and Richard J. Helmer, Los Alamos, N. Mex., assignors to the United States of America as represented by the United States Atomic Energy Commission Filed Feb. 7, 1958, Ser. No. 714,006
2 Claims. (Cl. 324—111)

The present invention relates to current integrators, and more specifically to a continuous-reading highly accurate integrator for measuring electric currents in the microampere range.

Apparatus of the type herein concerned are particularly necessary in scientific research for measuring the beam currents of particle accelerators. These currents frequently fluctuate widely in value. In order to determine the number of charge-carrying particles emitted from a substance or impinging on a target over a selected interval, it is necessary to measure accurately the integrated value of the current for the selected duration and determine the number of particles by dividing by the particle charge.

A feasible technique for obtaining the integral value of a current is to discharge a capacitor having a known charge with the current. One such device is described by Worthington et al., in the Physical Review, Vol. 90, page 899, et seq., published in 1953. In this device a capacitor of known capacitance is charged to a selected potential and therefore has a known charge. The capacitor is connected to the unknown current source until it is discharged and the time-integral of the unknown current can be readily calculated. This device, although capable of accurate results, is inherently intermittent in nature in that when the capacitor is discharged it must be disconnected from the unknown current source and recharged. In addition, the accuracy of the method is impaired to some extent because of the soakage characteristics inherent in all capacitors utilizing a solid or liquid dielectric.

It has been found to be highly desirable to provide a current integrating device which is continuous in operation, which is exceedingly accurate and which is not subject to error due to the soakage characteristics. In the present invention the technique of comparing the unknown current integral to the charge in a capacitor is utilized.

However, the present teaching departs from the earlier teachings in the art in that the source of the unknown current is continuously connected to a capacitor and the resulting charge on this capacitor is removed by intermittent shunting with a smaller capacitor of known value having a known charge at a rate determined by the instantaneous values of the unknown charge. A further feature of the present invention is that the smaller capacitor hereinafter termed "the discharge capacitor" is rapidly cyclically reversed in polarity to eliminate the susceptibility to soakage error. For purposes of brevity, the capacitor which is charged by the unknown current is hereinafter termed "a source capacitor." The apparatus, in accordance with the teachings of this invention, is made automatic by the provision of a servo system which is sensitive to a very small change in potential across the source capacitor to change the rate at which the discharge capacitor is connected to the source capacitor.

Other features and advantages of the present invention will become apparent as this description proceeds with reference to the figures of the drawing.

2

Figure 1:
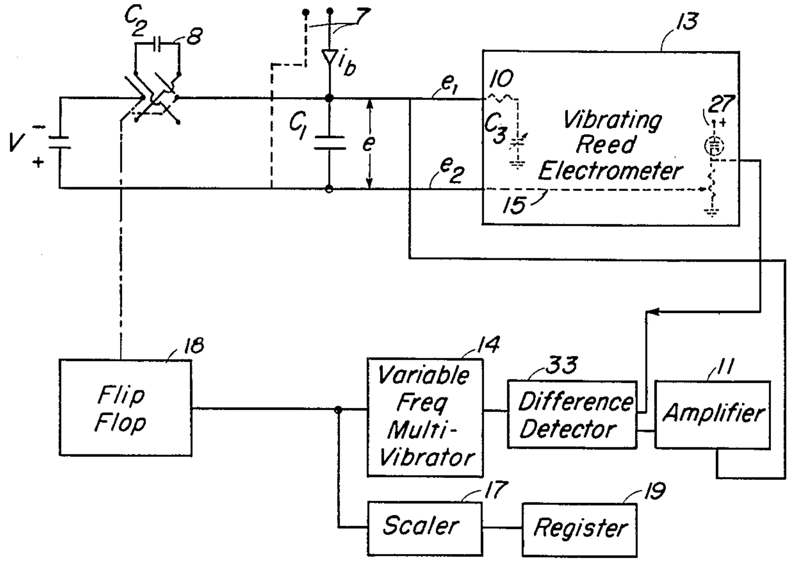
FIGURE 1 is a simplified equivalent schematic and block diagram of the system of components making up the measuring device of the present invention.

Referring to FIGURE 1, the conductors carrying the unknown current $i_b$ to be measured are indicated by the numeral 7. A source capacitor $C_1$ is connected in series with the unknown current source. It is apparent that the unknown current will tend to charge capacitor $C_1$, thereby establishing a potential $e$. A small capacitor $C_2$ of accurately known value is connected by means of a reversing switch 8 in series with a potential source V and the source capacitor. The polarity of the potential source is such that in the series circuit of $C_1$ and $C_2$ it opposes the potential generated by $i_b$ across $C_1$. The potential $e$ across the source capacitor is impressed on the input circuit of an electrometer 13.

The principle of current measurement of this circuit is briefly as follows. The current to be integrated charges capacitor $C_1$ causing the voltage $e$ across the capacitor to rise with the upper terminal going positive. $C_2$, which is very small compared to $C_1$, is charged by a source of accurately known voltage V so that its charge is $C_2V$. If $C_2$ is then reversed while $e$ is still very small compared to V, the amount of negative charge transferred to $C_1$ is very nearly $2C_2V$. On each reversal of $C_2$ the voltage $e$ is reduced by an amount $2C_2V/C_1$. To remove the charge on $C_1$ due to a current $i_b$, $C_2$ must be reversed at a frequency of $i_b/(2C_2V)$ c.p.s. As will presently become apparent, a servo system provides the reversal of $C_2$ at a frequency depending on the quantity of $i_b$.

It has been found that the so-called vibrating-reed electrometer more accurately termed a modulator-demodulator with negative feedback and in which the modulator is of the vibrating-reed type is particularly adapted to provide a major component in a device constructed in accordance with the teachings of this invention. This type measuring device is described in the Review of Scientific Instruments, 1947, vol. 18, No. 5, pp. 298–314. This type of modulator-demodulator is, in effect, a very desirable type of feedback amplifier because it has a very high impedance input, thus avoiding any deleterious effect on the high impedance current source. In addition, this type modulator-demodulator has an exceedingly small drift factor, and an inverse feedback of particular value in the present application. Since the current to be measured is so exceedingly minute, it is very desirable to maintain the potential of any conductors to which it is connected as close to ground potential as possible in order to inhibit leakage. To this end, the modulator-demodulator, through its inverse current feedback circuit 15, acts to raise or lower the lower terminal of the source capacitor in such a way as to maintain the upper terminal very nearly at ground potential. However, the vibrating-reed modulator-demodulator has one deficiency which later will be more fully explained but which, in brief, is that it is unable to respond instantaneously to abrupt changes in the value of the voltage developed by the unknown current. Therefore, to continuously maintain the upper terminal at a constant near-zero potential, a supplemental amplifier is utilized in conjunction with the modulator-demodulator to obtain substantially instantaneous response.

Th output of the modulator-demodulator is taken off a cathode follower 27 where it has a gain of 30 in this particular embodiment with respect to the input voltage. This output is connected to one input of a difference detector. The fluctuations in potential derived from the high impedance side of the modulator-demodulator input are impressed on the input of a substantially instantaneously responsive auxiliary amplifier 11 and the output of this amplifier connects to the second input of the difference detector. It follows that although the output potential of the modulator-demodulator may lag a sudden increase in potential $e_1$, the potential $e_1$ fed directly to amplifier 11 results in a prompt output from this amplifier and therefore an output is obtained from the difference detector until the modulator-demodulator "catches up" and delivers an equal potential to the input of amplifier 11. The output of the difference detector controls the rate of oscillation of variable frequency multivibrator 14 which in turn controls the rate of flip-flop 18. Flip-flop 18, in a manner later to become apparent, controls reversing switch 8 and therefore the rate at which the charge of capacitor $C_2$ is "dumped" with discharge polarity into capacitor $C_1$.

The output of the variable frequency multivibrator is also coupled to a scaler 17 which in turn is connected to register 19 which therefore gives a continuous reading of the rate at which capacitor $C_2$ is needed to maintain capacitor $C_1$ in a preselected constant, preferably nearly zero potential condition.

Figure 2:
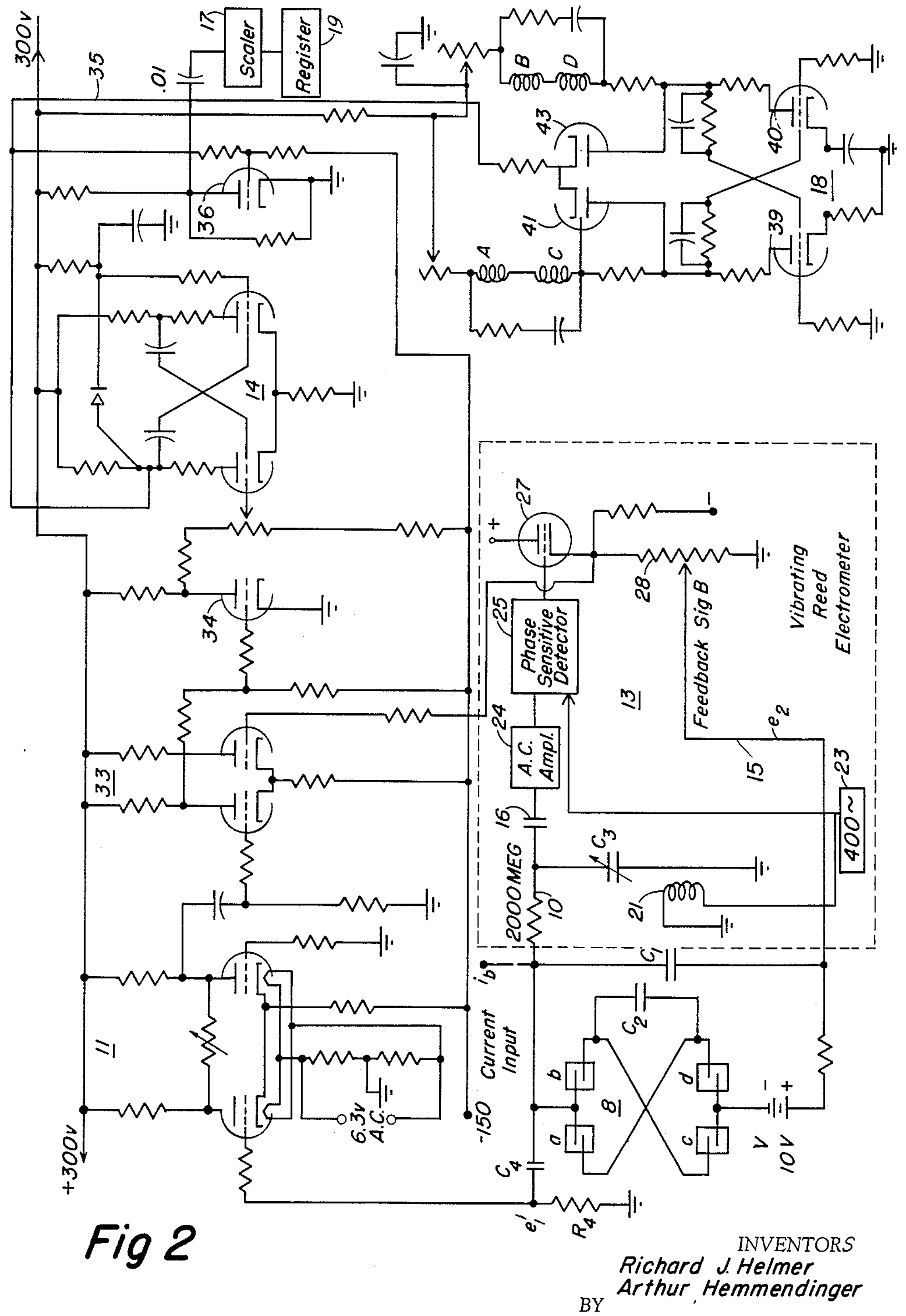
FIGURE 2 is a circuit diagram of the system shown in FIGURE 1.

The detailed features of the present invention are shown in FIGURE 2. The reversing switch 8 of FIGURE 1 comprises four individual switches *a, b, c* and *d* of the type known in the art as Glaswitches. Each of these switches is a single-pole single-throw normally open switch, consisting of a pair of ferro-magnetic reeds sealed into opposite ends of a glass tube. The contacts are closed by application of an axial magnetic field. Four of these switches, connected as shown, provide a reversing switch when operated in the proper sequence by energization of coils A, B, C and D connected in the circuitry of flip-flop 18. These switches are particularly suitable for the present application because they are used in a portion of the circuit where insulation resistance of thousands of megohms is required, and in addition they are capable of switching rates of hundreds of cycles per second. The Glaswitch is described in Engineering Bulletin No. 1057, published by the Revere Corporation of America, Wallingford, Connecticut.

Discharge capacitor $C_2$ is connected to reversing switch 8 and constant potential source V in a manner equivalent to that shown in FIGURE 1. Source capacitor $C_1$ has one terminal, hereinafter termed "the high impedance terminal," connected to the source of minute unknown current $i_b$ through one of leads 7. The source capacitor $C_1$ is also coupled across the input of the modulator-demodulator circuit 13. The modulator-demodulator input contains a series resistor 10 of very high value such as 2,000 megohms and connected between the end of this resistor and ground is a capacitor $C_3$ of the vibrating-reed type. This capacitor has one plate which is fixed and one plate which can be vibrated toward and from the fixed plate. The vibrating plate or reed is actuated by an energizing coil 21 connected to a local timing wave source of oscillation 23. Vibrating-reed capacitor $C_3$, being very small in capacitance, promptly assumes the same potential as exists between the high impedance side of capacitor $C_1$ and ground. This potential results in a proportional A.C. potential having a frequency of the local source of oscillation 23. The high impedance terminal of $C_3$ is coupled through capacitor 16 to the input of A.C. amplifier 24 associated with, and included in electrometer 13. The output of amplifier 24 is connected to one input of phase-sensitive-detector 25. The second input of phase-sensitive-detector 25, which is of a type well known in the art, is connected to the local source of oscillations so that the polarity of the phase-sensitive-detector output is determined by the phase of the potential on $C_3$ and therefore to the polarity of potential of $C_1$. The output of the phase-sensitive-detector is connected to the grid of cathode follower 27. Feedback of "one" factor is taken from the cathode load resistor 28 and provides the return circuit for source capacitor $C_1$ and it is of such polarity that when the potential of the high impedance terminal of $C_1$ tends to rise the lower terminal of $C_1$ is lowered, thereby maintaining the potential on the high impedance side of $C_1$ substantially constant and small in value.

As was previously noted, there is a slight time lag in the feedback signal of the modulator-demodulator. This effect, if not corrected, leads to the establishment of potentials not desired on $C_1$ and because of the time lag, to an unstable servo correction. To provide very much faster response and correction a potential $e_1'$ is derived from the potential on the high impedance side of source capacitor $C_1$ and this potential is coupled through capacitor $C_4$ to the input of auxiliary amplifier 11. The gain of amplifier 11 is selected to equal the gain of the modulator-demodulator. The output of amplifier 11 is fed to one input of difference detector 33 and the other side of difference detector 33 has its input connected to the cathode of modulator-demodulator cathode follower 27. The output of the difference detector is coupled to amplifier and inverter tube 34 and the output of this stage is coupled to variable frequency multivibrator 14. This multivibrator is a conventional positive-bias multivibrator which produces pulses at a frequency proportional to its input voltage. The output of the multivibrator 14 is coupled through lead 35 and diodes 41 and 43 to scaler type flip-flop 18 and therefore controls its rate of switching. Switch energizing coils A and C are connected in series with the anode of triode 39 of flip-flop 18. Switch energizing coils B and D are connected in series with the anode of triode 40 of flip-flop 18. It follows that when tube 39 is conducting, switches *b* and *d* are open and switches *a* and *c* are closed, thereby connecting capacitor $C_2$ with one polarity in series with potential source V and source capacitor $C_1$. When tube 40 is conducting, switches *a* and *c* are open and switches *b* and *d* are closed thereby connecting discharge capacitor $C_2$ in series with potential source V and source capacitor $C_1$ with the opposite polarity. From the foregoing it is seen that a fast-responding servo system has been described which controls the frequency of connection of discharge capacitor $C_2$ with potential source V and source capacitor $C_1$ such that the potential across capacitor $C_1$ is maintained within very narrow limits.

It should be noted that the input of tube 36 is coupled to the output of multivibrator 14 and its output is connected to scaler 17 which in turn is connected to register 19. It is seen, therefore, that over any selected interval of measurement time of the unknown current $i_b$ that a precise count is made of the number of times capacitor $C_2$ is discharged into the source capacitor $C_1$ to equal the quantity of $i_b$.

The manner in which the auxiliary amplifier 11 overcomes the lack of fast response of the electrometer is shown by the following considerations explained with reference to FIGURES 2 and 3.

The potential variations occurring across $C_1$ due to sudden fluctuations in $i_b$ cannot be detected instantaneously by the modulator-demodulator because of its relatively slow response. Unless prevented, this would result in excursions in potential across capacitor $C_1$ thereby causing some leakage losses and variations in impedance facing the source of current $i_b$. If the feedback potential alone is used to control the servo system operating the discharge capacitor, a phase displacement would be present between the potential excursions on $C_1$ and the rate at which the servo system and discharge capacitor $C_2$ tends to restore the potential to the selected value. It is necessary therefore to provide an instantaneous stimulus to the servo system with this stimulus disappearing or canceling out as the electrometer feedback voltage assumes its proper value. These remarks are made clear from a mathematical consideration.

The modulator-demodulator has a gain of $A/(1+j\omega T)$, where A is its D.C. gain, T is its time constant and $\omega$ equal $2\pi f$. The input potential $e_{C_1}$ (referring to FIGURE 3) is seen to be the difference between the instantaneous potential $e_1$ on the high impedance terminal of $C_1$ and the feedback potential $e_1$, where $$e_2=-ABe_1/(1+j\omega T)$$

wherein B is the fraction of the output of the modulator-demodulator which is fed back.

The factor AB, which is the D.C. loop gain of the modulator-demodulator, is large compared to unity. Solving for $e_1$ and $e_2$ in terms of $e_{C_1}$, we obtain $$e_1=e_{C_1}(1+j\omega T)/(1+AB+j\omega A)$$
$$e_2=e_{C_1}(-AB)/(1+AB+j\omega T)$$

The network coupling between the modulator-demodulator input and auxiliary amplifier 11 is a resistance-capacitance network $C_4R_4$ having a time constant $t$ and therefore has the transfer function $$j\omega t/(1+j\omega t)$$

Figure 3:
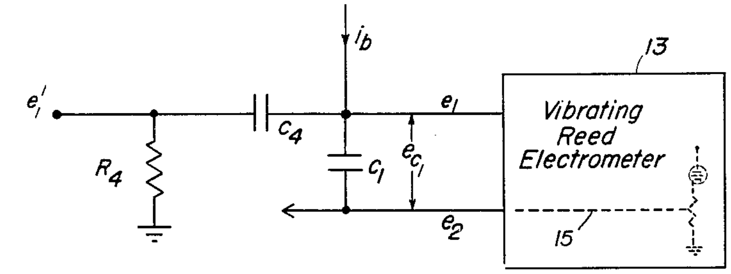
FIGURE 3 is a partial schematic and block diagram useful in explaining some of the principles of the present invention.

The output signal for the auxiliary A.C. amplifier is designated $e_1'$ (see FIGURES 2 and 3)

$$e_1'=e_{C_1}(1+j\omega T)j\omega t/[(1+AB+j\omega T)(1+j\omega t)]$$

The voltages $e_1'$ and $e_2$ can be substracted in a difference amplifier without leakage of charge from $C_1$ because the part of the circuitry upon which $e_1'$ appears is isolated from $e_1$ by D.C. blocking capacitor $C_5$. Performing the subtraction, one obtains $$e_1'-e_2=e_{C_1}\frac{AB+j\omega t(1+AB)-\omega^2 Tt}{1+AB+j\omega t[T/t+(1+AB)]-\omega^2 Tt}$$

For the condition AB>>1 and $t>>T/AB$ one sees, by comparing like powers of $\omega$ in the numerator and denominator, that $e_{C_1}$ closely approximates the difference $(e_{12}-e_2)$. This difference is then a measure of the voltage on $C_1$ without the bandwidth limitation imposed by the modulator-demodulator.

Accordingly, the difference circuit 33 follows auxiliary amplifier stage 11 which provides a gain (30 in this embodiment) equal to the gain of the modulator-demodulator obtained at the cathode of cathode follower 27 (FIGURE 2). The voltage $e_1'$ is applied to the grid of the input tube of the cathode coupled triodes of amplifier 11 and the output of the amplifier is impressed on the grid of one of the triodes of differential amplifier 33. The grid of the other tube of this pair is connected to the cathode follower 27 of the modulator-demodulator. The potential derived from the cathode follower is $30e_2$. The output from the difference amplifier is coupled to the input of and inverted and further amplified by tube 34. Tube 34 is direct-current coupled to positive-bias multivibrator 14 by connection to the left-hand triode. The output of the multivibrator is coupled to the input of flip-flop 18 comprising triodes 39 and 40 through conductor 35 and diodes 41 and 43. Each negative pulse from the left-hand triode of multivibrator 13 changes the state of conduction of the flip-flop. The anodes of triodes 39 and 40 are connected to the anode potential source through switch actuating coils A and C and B and D, respectively. It follows that when flip-flop triode 39 is conducting, switches *a* and *c* are closed, and the terminals of $C_2$ are connected in series with V and $C_1$ and when triode 40 is conducting, switches *b* and *d* are closed, thereby interchanging the terminals of $C_2$ with respect to V and $C_1$. Thus the "discharge" capacitor $C_2$ is reversed in polarity with each switching operation.

It is therefore seen that a current integrator capable of continuous operation and exceedingly high accuracy has been described.

Although the foregoing is a teaching of the invention as applied to a preferred embodiment, modifications may be made, and it is understood that the invention is not intended to be limited by the details of the preferred embodiment but only by the recitations in the appended claims taken in view of the prior art.

What is claimed is:

1. In an apparatus for measuring the integral of minute electrical currents, a source capacitor connected to the source of said electrical currents, a modulator-demodulator with negative feedback and in which the modulator is of the vibrating-reed type and having a response time which is longer than the time of variation of the currents to be measured, said modulator-demodulator having a high impedance input terminal, means electrically connecting one terminal of said source capacitor to said modulator-demodulator high impedance input terminal and the other terminal of said source capacitor to the modulator-demodulator feedback circuit, auxiliary amplifier means having an amplification factor equal to the gain of the modulator-demodulator and having a substantially instantaneous response rate and having its input capacitively coupled to the source capacitor, difference potential detecting means connected to both the output of the modulator-demodulator and the axuiliary amplifier means to provide a control potential proportional to the amplitude of departure from zero of the potential at said one terminal of the source capacitor, a discharge capacitor, a reversing switch and a potential source of known value, means responsive to said control potential for operating said reversing switch for successively reversibly connecting said discharge capacitor serially in a series comprising said potential source of known value and said source capacitor with the polarity of the known value potential source being opposite to the polarity of potential on the source capacitor in said series circuit and at a rate determined by the amplitude of the said control potential to thereby maintain the said one terminal of the source capacitor at zero potential, substantially, a scaler having its input coupled to the means for operating the reversing switch and a count recording register connected to the output of the scaler to indicate the number of discharges of said discharge capacitor which are required to cancel the quantity of electricity contained in the said minute electrical currents over any selected duration of measurement.

2. The device of claim 1 in which said means responsive to said control potential is a variable frequency multivibrator coupled to the output of the difference potential detecting circuit, and having its output connected to the input of a scaler flip-flop, reversing switch actuating means connected to said flip-flop for operating said reversing switch at a rate corresponding to the frequency of said variable frequency multivibrator and therefore proportional to the amplitude and direction of the output potential of the difference potential detecting circuit.

References Cited in the file of this patent

UNITED STATES PATENTS

| | | |
|---|---|---|
| 2,607,528 | McWhirter | Aug. 19, 1952 |
| 2,615,063 | Brown | Oct. 21, 1952 |
| 2,835,868 | Lindesmith | May 20, 1958 |
| 2,897,445 | Goodale | July 28, 1959 |